No. 776,383.

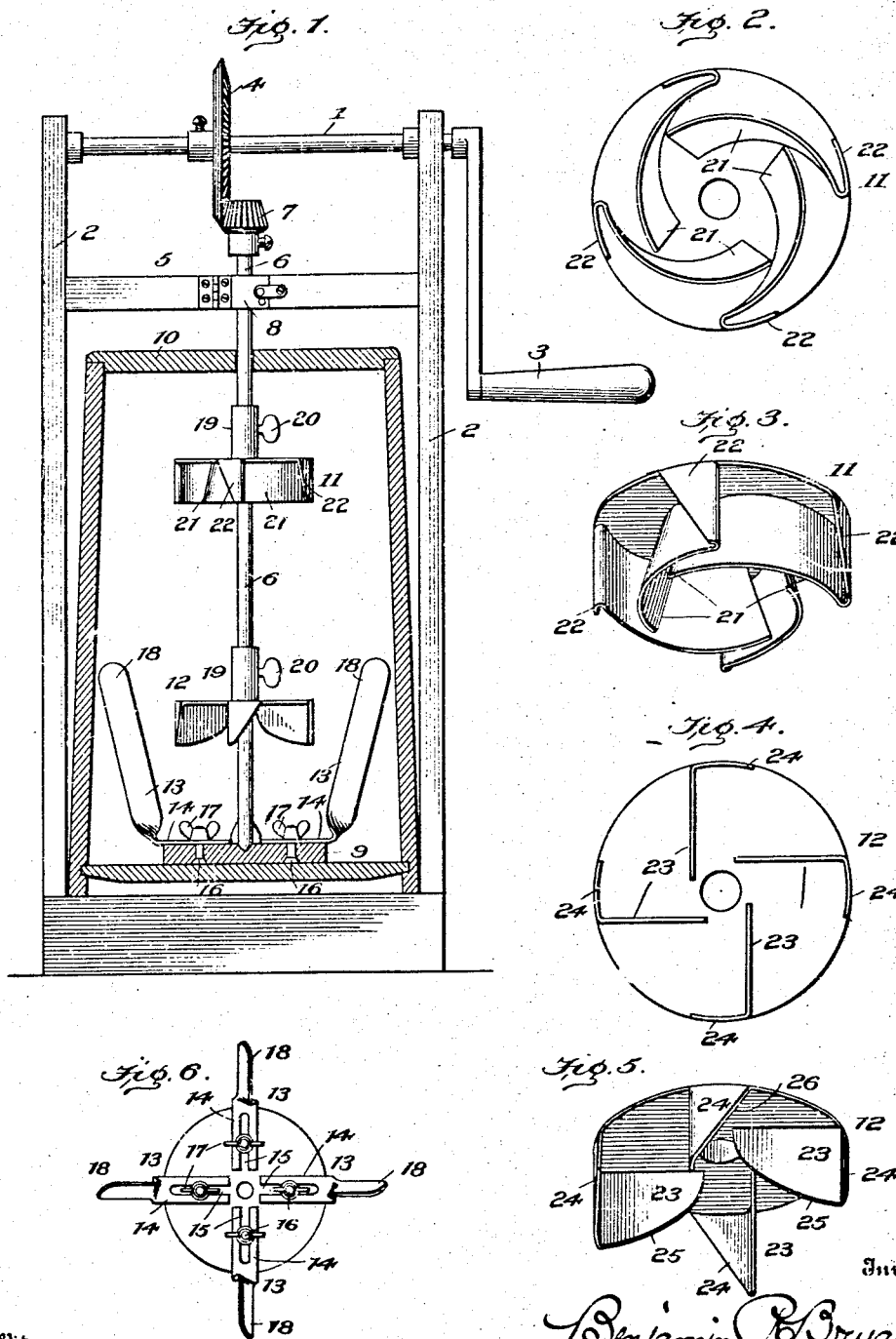

Patented November 29, 1904.

UNITED STATES PATENT OFFICE.

BENJAMIN R. BRYAN, OF ELBA, ALABAMA.

CHURN.

SPECIFICATION forming part of Letters Patent No. 776,383, dated November 29, 1904.

Application filed December 14, 1903. Serial No. 185,058. (No model.)

*To all whom it may concern:*

Be it known that I, BENJAMIN R. BRYAN, a citizen of the United States, residing at Elba, county of Coffee, and State of Alabama, have invented certain new and useful Improvements in Churns, of which the following is a specification, reference being had to the accompanying drawings.

This invention has relation to churns; and it consists in the novel construction and arrangement of its parts, as hereinafter described.

The object of the invention is to provide a churn with horizontal rotary dashers to coöperate with upwardly-extending blades to keep the contents of the churn moving in vertical courses, so that the said contents will be churned and worked evenly.

In the accompanying drawings, Figure 1 is a vertical sectional view of the churn. Fig. 2 is a bottom view of the upper dasher. Fig. 3 is a perspective view of the same. Fig. 4 is a bottom view of the lower dasher. Fig. 5 is a perspective view of the same, and Fig. 6 is a top plan view of the base-plate provided with adjustable upwardly-extending blades.

The horizontal shaft 1 is journaled in the frame 2 and is provided at one end with the crank-handle. The bevel gear-wheel 4 is fixed to the shaft 1 at an intermediate point thereof. The framework 2 is provided with a cross-piece 5, in which is journaled the upper end of the vertical shaft 6, the upper end of said shaft being provided with a bevel-pinion 7, which meshes with a bevel gear-wheel 4. The bearing 8 is provided with a hinged member, which may be opened for the purpose of detaching the shaft 6 from the cross-piece 5. The churn 8 is adapted to rest upon the lower portion of the frame 2, and the plate 9 rests upon the bottom of the churn 8. The lower end of the shaft 6 rests in the center of the plate 9. The said shaft 6 passes through the center of the churn-top 10 and is provided with the upper dasher 11 and the lower dasher 12, each of which is of special construction and will be hereinafter explained. The blades 13 are attached to the upper face of the plate 9. Said blades are adapted to be adjusted radially with relation to the said plate 9, the said blades being preferably made of sheet metal. Each of the said blades consists of the horizontal portion 14, provided with an elongated slot 15. The set-screw 16 passes through said slot, and the portion 14 is bound to the plate 9 by the thumb-nut 17, screwed upon the upper end of the set-screw 16. At the outer end of the horizontal portion 14 the said blade is bent up into the portion 18, the longitudinal axis of which extends at an angle to the longitudinal axis of the shaft 6 and the transverse axis of which extends at an angle to the transverse axis of the plate 9.

The dashers 11 and 12 are each provided with a sleeve 19 and set-screw 20, by means of which the said dashers may be adjusted along the shaft 6 and secured in any desired position thereon. The dasher 11 is provided with the curved blades 21, which extend down from the top of the said dasher in substantially conical form. The blades extend uniformly from a point near the center of the dasher-top to the edge thereof, where the said blades are bent back, as at 22. A dasher 12 is provided with the blades 23, which extend down vertically from the top of the said dasher and extend from a point near the center of the top thereof to the edge of the top, where they are bent back, as at 24. The lower edges of the blades 23 are curved, as at 25, and the lower edges of the portions 24 extend at an angle to the vertical axis of the dasher, as at 26.

The operation of the churn is as follows: The parts being arranged as shown in Fig. 1, the shaft 1 is rotated, which, through the gear-wheel 4 and pinion 7, transmits rotary motion to the shaft 6. The blades of the lower dasher 12 are so constructed that the cream is thrown in horizontal directions against the blades 18, which have a tendency to prevent the cream from following a circular path along the inner side of the churn, but divert the said cream upward. The blades of the dasher 11 are so constructed that the cream is forced toward the bottom of the churn. Consequently the contents of the churn is thoroughly and evenly agitated.

Having thus described my invention, what I claim as new, and desire to secure by Letters Patent, is—

1. In a churn having a means for forcing the contents thereof upward, a horizontal rotating dasher adapted to force the contents downward consisting of a top having on its under side a series of blades extending downwardly in substantially conical form, said blades extending regularly from a point near the center of the top to the edge thereof and having backwardly-extending portions.

2. In a churn having a means for forcing the contents thereof downward, a horizontal rotating dasher adapted to direct the contents horizontally consisting of a top having downwardly-extending blades, the lower edges of which are curved, said blades extending regularly from a point near the center of the top to the edge thereof having backwardly-extending portions, with edges extending at an angle to the vertical axis of the dasher and a means for directing the contents of the churn upward.

In testimony whereof I affix my signature in the presence of two witnesses.

BENJAMIN R. BRYAN.

Witnesses:
J. D. LEE,
J. B. LIGHTNER.